(12) United States Patent
Wang

(10) Patent No.: US 6,710,710 B1
(45) Date of Patent: Mar. 23, 2004

(54) WARNING MODULE ON REAR APPROACHING CARS

(76) Inventor: Ping-Shih Wang, No. 8, Ting-Ping Rd., Jui-Fang Chen, Taipei Hsien (TW)

( * ) Notice: Subject to any disclaimer, the term of this patent is extended or adjusted under 35 U.S.C. 154(b) by 0 days.

(21) Appl. No.: 10/186,420

(22) Filed: Jul. 2, 2002

(51) Int. Cl.7 .................................................. B60Q 1/26
(52) U.S. Cl. ...................... 340/468; 340/470; 340/472; 340/463; 340/473; 340/461; 340/458
(58) Field of Search ................................. 340/468, 470, 340/472, 463, 473, 461, 458

(56) References Cited

U.S. PATENT DOCUMENTS

| | | | | |
|---|---|---|---|---|
| 4,815,689 A | * | 3/1989 | Schiff | 248/481 |
| 4,906,088 A | * | 3/1990 | Casey | 359/865 |
| 4,972,173 A | * | 11/1990 | Raciti | 340/472 |
| 5,193,895 A | * | 3/1993 | Naruke et al. | 362/542 |
| 6,160,475 A | * | 12/2000 | Hornung et al. | 340/461 |
| 6,184,786 B1 | * | 2/2001 | Medeiros | 340/463 |

* cited by examiner

*Primary Examiner*—Daniel J. Wu
*Assistant Examiner*—Tai T. Nguyen
(74) *Attorney, Agent, or Firm*—Birch, Stewart, Kolasch & Birch, LLP

(57) ABSTRACT

A warning module for rear approaching cars aims at providing dual effects of safety and warning for passengers and the rear approaching cars. The module include a rearview mirror installed on a car door of a car to enable the passengers to see the rear approaching cars in a selected angular range and decide whether to open the car door. A warning light is also mounted onto the car door. The warning light includes a rear light face and a side light face for generating light when the car door is opened to alert the rear approaching cars, and to ensure the safety of the passengers and safe driving of the rear approaching cars.

17 Claims, 5 Drawing Sheets

WARNING MODULE ON REAR APPROACHING CARS

FIELD OF THE INVENTION

The present invention relates to a warning module for rear approaching cards and particularly a warning apparatus adopted on cars for alerting passengers when opening car doors to get out of the cars.

BACKGROUND OF THE INVENTION

In the new century we are living now, cars have been gradually transformed from transportation vehicles to moving offices. Many auxiliary systems have been developed and introduced to help drivers to avoid traffic congestion, find out the optimal routes, make hotel reservations or seek helps from emergency services, or enhance driving safety. While those auxiliary systems may help the drivers to overcome many inconveniences during driving and improve the safety of driving, the safety design for passengers during alighting from the cars is one area which is mostly overlooked.

As shown in FIG. 1, a conventional car has rearview mirrors mounted on the front car doors to enable the driver or the passengers on the front seat to see if there are rear approaching cars when getting of the car. However the rear car doors do not have the rearview mirrors to give the passengers on the rear seat same kind of aids and warning about the rear approaching cars. If the passengers open the rear car doors inadvertently without due judgement, it could easily result in hit accidents and hurt the passengers or the drivers of the rear approaching cars.

Moreover, even if the front car doors have rearview mirrors to enable the driver and the front seat passengers to see in advance the rear approaching cars before getting off the car, the rearview mirrors have a limited viewing angle and cannot completely capture a wide angle rear view of the car. The situation becomes especially serious at the turns of the road or on the sloped roads. In addition, the rear seat passengers mostly are children or people who have no driving experience, and do not have keen awareness of the dead angle of the rearview mirrors. Furthermore, the rearview mirrors do not function very well in darkness or at night when the ambient light is weak. In general, if the motorcycles or the cars have the headlights turned on, the light may be used to judge the rear approaching cars. But bicycles generally do not have headlights. How to overcome the problems and risks mentioned above deserves serious considerations.

SUMMARY OF THE INVENTION

Therefore the primary object of the invention is to resolve aforesaid disadvantages. As driving safety and avoidance of accidents requires the awareness and alertness of two sides, the invention aims at providing an apparatus that offers safety warning of the opening car doors to the passengers and the drivers of the rear approaching cars. A rearview mirror is installed on the car door to enable the passenger to see the rear approaching cars within a desired angular range so that the passenger may judge the rear approaching cars before opening the car door. This is the first protection measure. The car door further has a warning light mounted thereon at a desired location matching the opening angle of the car door so that the warning light is turned on when the car door is opened to alert the rear approaching cars. This is the second protection measure. With the dual protection measures set forth above, the safety of the passengers and the drivers of the rear approaching cars may be effectively enhanced.

The foregoing, as well as additional objects, features and advantages of the invention will be more readily apparent from the following detailed description, which proceeds with references to the accompanying drawings, which are given by way of illustration only and thus are not limitative of the present invention.

DESCRIPTION OF THE PREFERRED EMBODIMENTS

Figure 1:
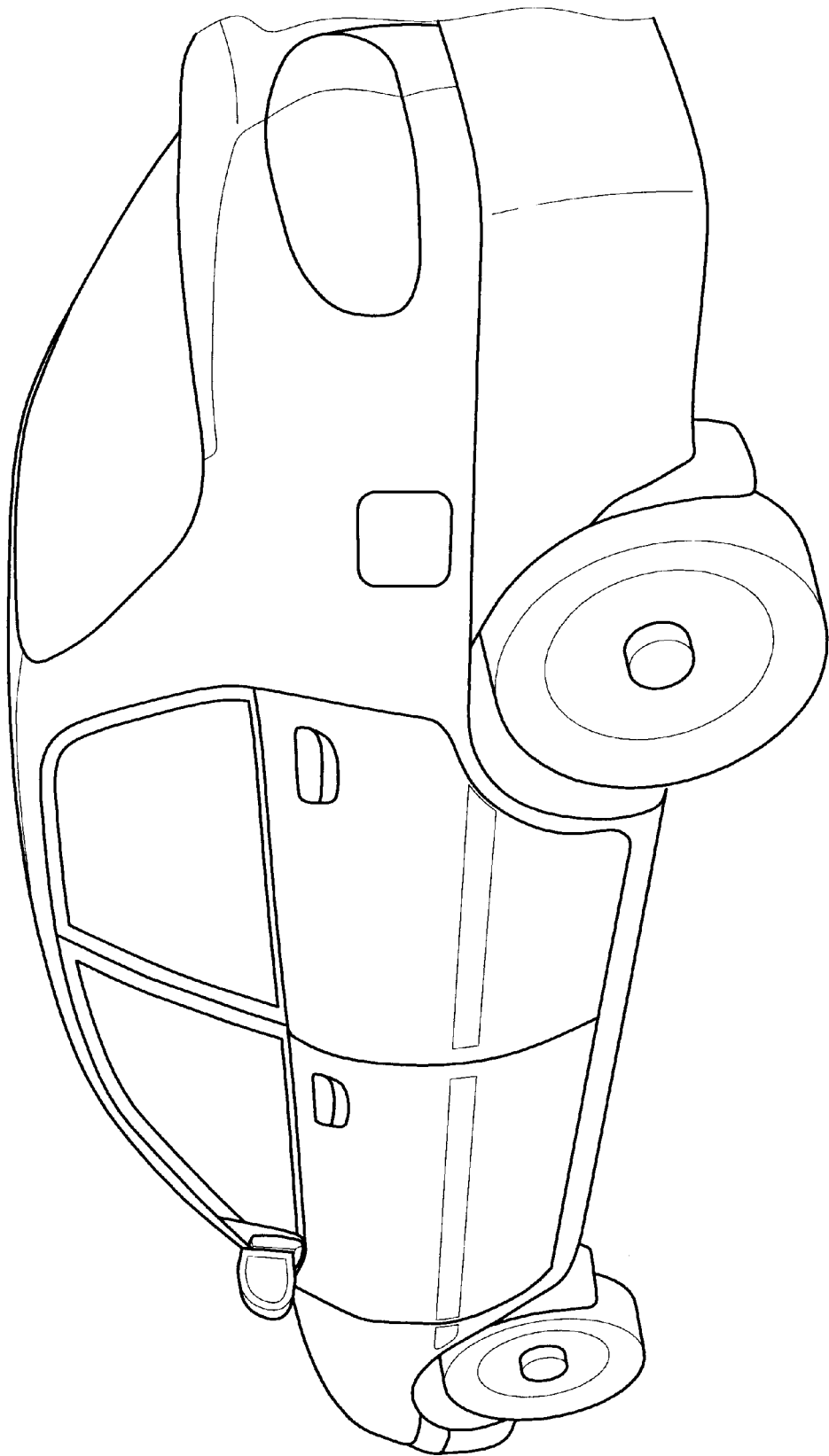
FIG. 1 is a schematic view of a conventional car.
Figure 2A:
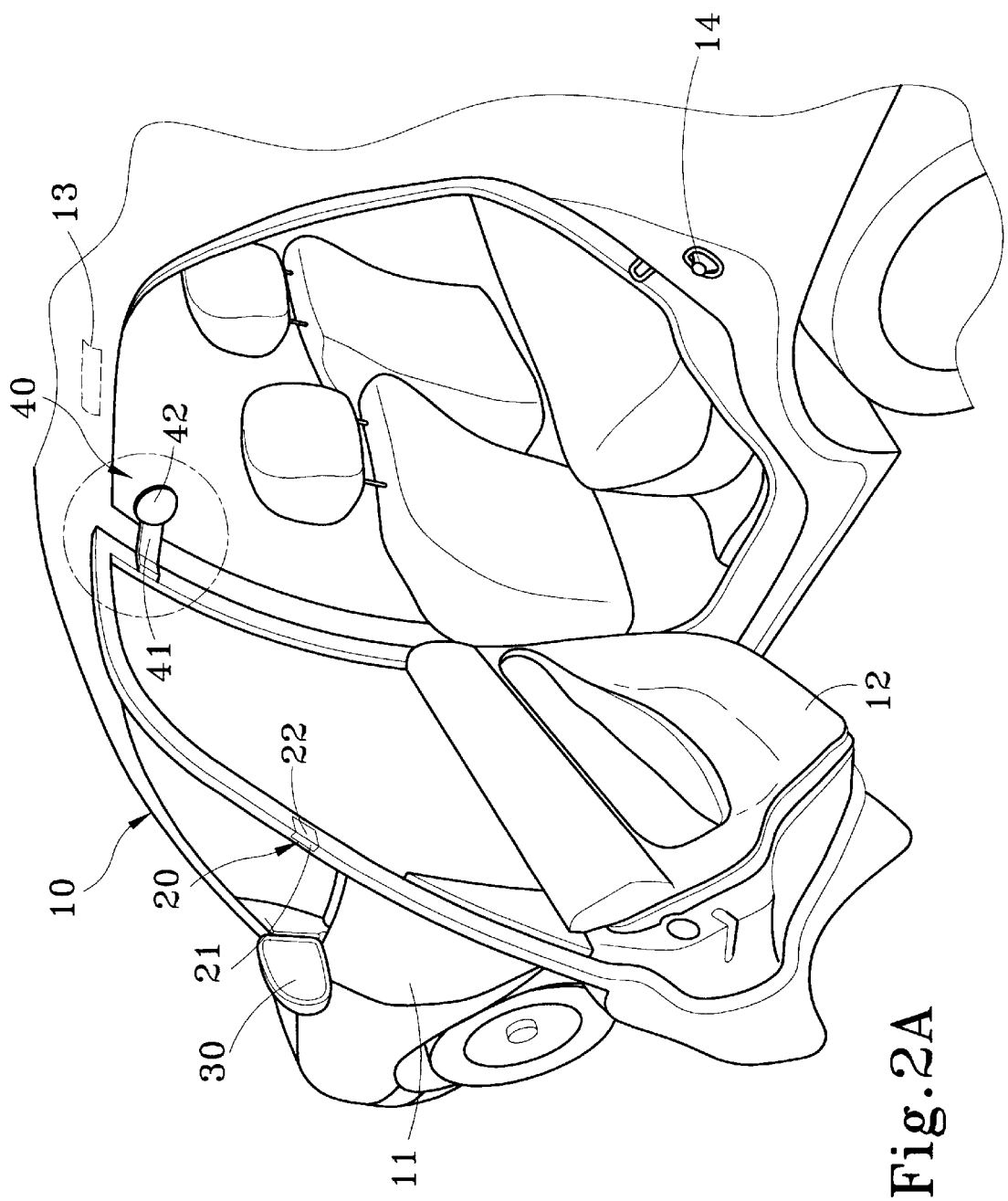
FIG. 2A is a schematic view of the invention, showing the installation location.
Figure 3B:
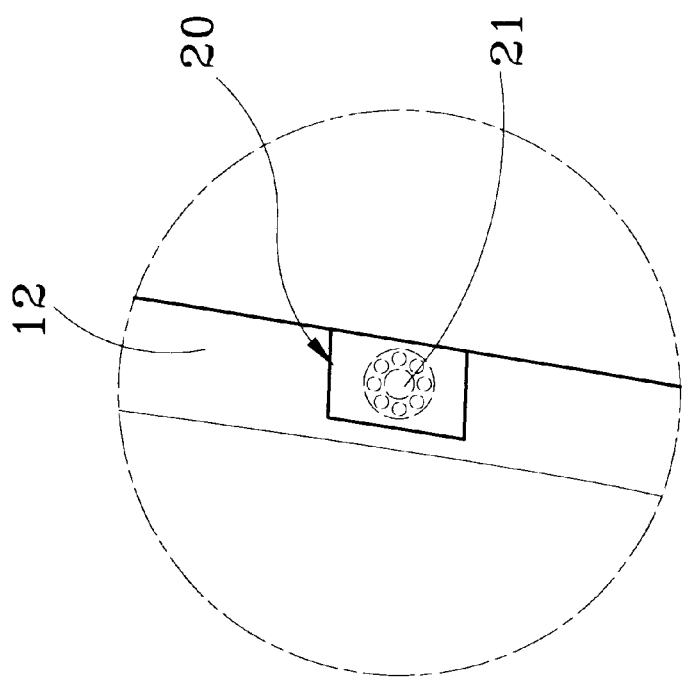
FIG. 3B is a schematic enlarged view of the waning light of the invention.
Figure 2B:
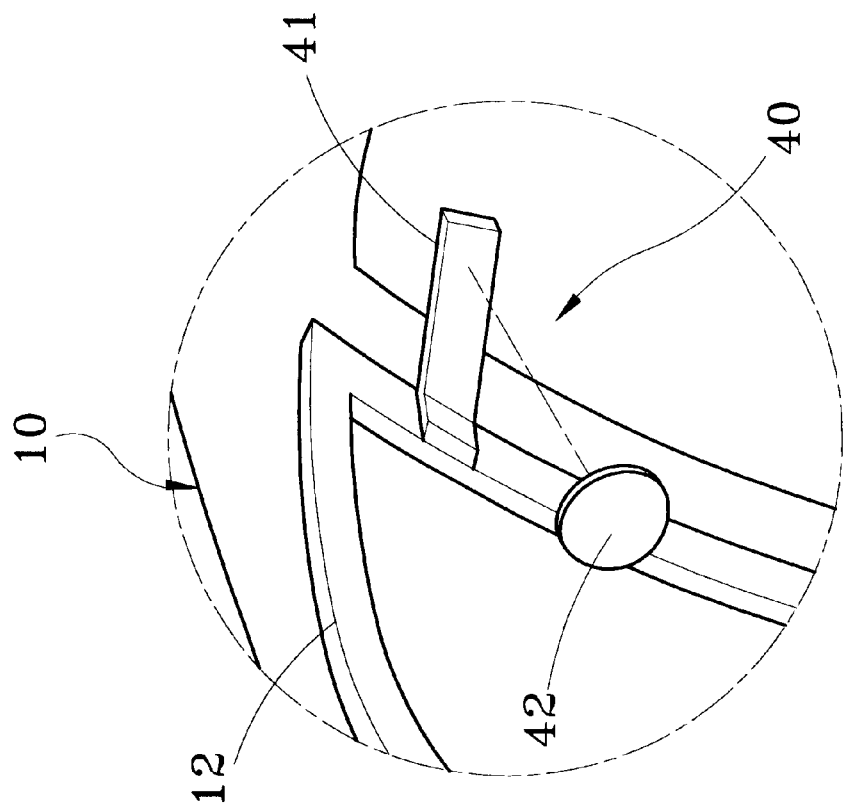
FIG. 2B is a schematic enlarged view of the rear view mirror according to FIG. 2A.

Referring to FIGS. 2A 2B and 3B, the invention is installed on car doors 11 and 12 of a car 10 to provide safety warning for passengers and the rear approaching cars. The car doors 11 and 12 have respectively a first rearview mirror 30 and a second rearview mirror 40 mounted thereon to enable passengers to view the rear approaching cars in a selected angular range. The first rearview mirror 30 is installed on the front car door 11 and may be substituted by the original rearview mirror 30 mounted on the front car door (or to install an additional second rearview mirror 40 to increase the range of the viewing angle). When the second rearview mirror 40 is installed on the rear car door 12, selection of the installation location should take into account of the rear seat passengers. Take installing the second rearview mirror 40 on the interior of the rear car door 12 as an example for the following descriptions. The upper right corner of the rear car door 12 is the optimal location for installing the second rearview mirror 40. The second rearview mirror 40 may be a wide angle lens including an anchor element 41 fastened to the interior of the rear car door 12 and a mirror 42 mounted onto the anchor element 41. When the rear seat passengers are going to get off the car, they can see on the mirror 42 of the second rearview mirror 40 whether there are rear approaching cars, and judge the distance if there is any before deciding whether to open the rear car door 12. In other words, the passengers may avoid to open the rear car door 12 abruptly, thus effectively give the rear approaching car a buffer time period and distance.

Figure 4:
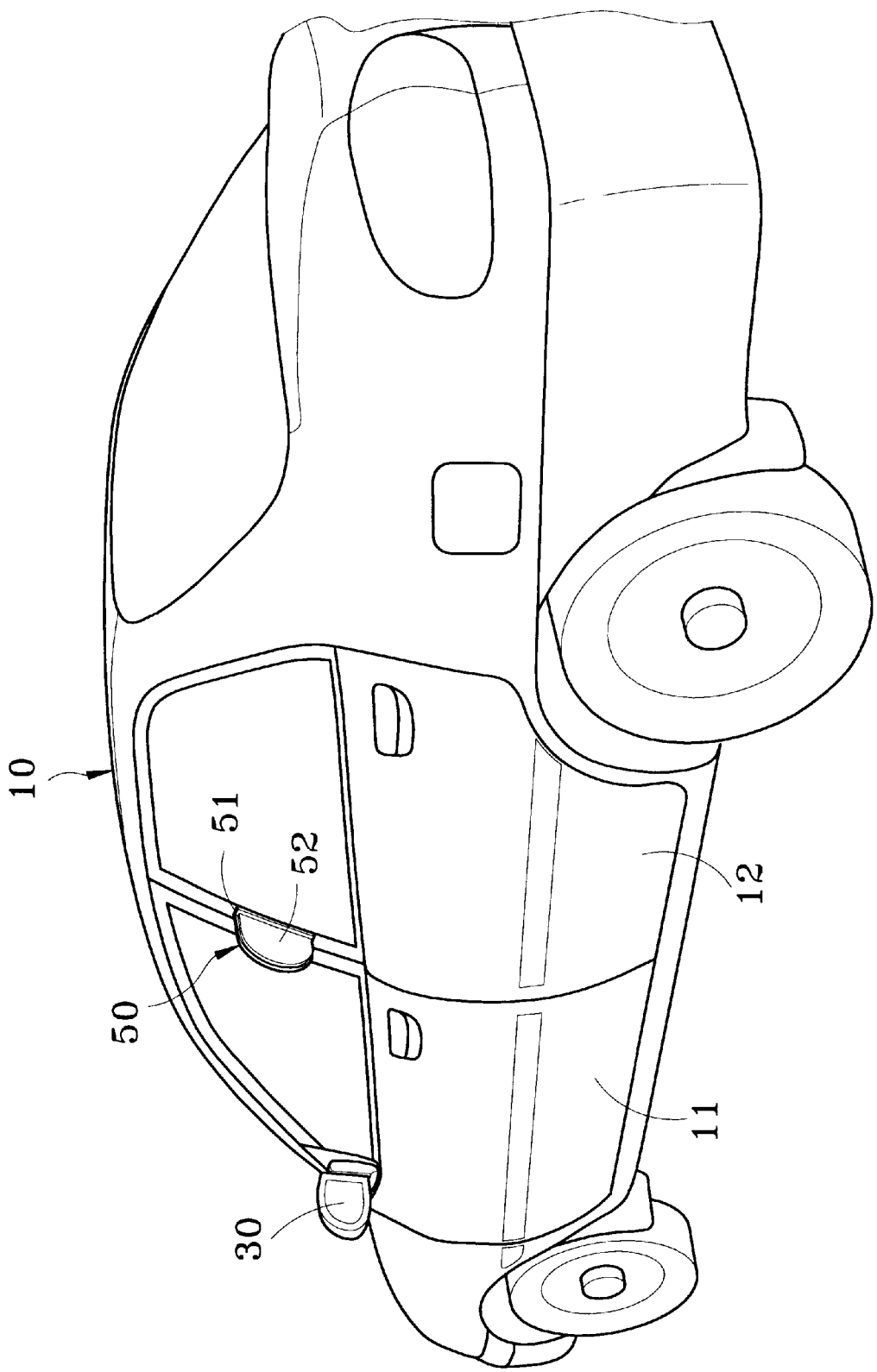
FIG. 4 is a schematic view of another embodiment of the rearview mirror of the invention.

As shown in FIG. 4, the rearview mirror 50 may also be installed on the exterior of the rear car door 12. Similarly, the rearview mirror 50 may also include an anchor element 51 fastening to the exterior of the rear car door 12 and a mirror 52 mounted onto the anchor element 51. The anchor element 51 may be a suction disc or a magnet to directly attach to the glass of the rear car door 12 or on the car 10. Thus the rear seat passengers may adjust the viewing angle based on their physical heights or sitting postures.

Figure 3A:
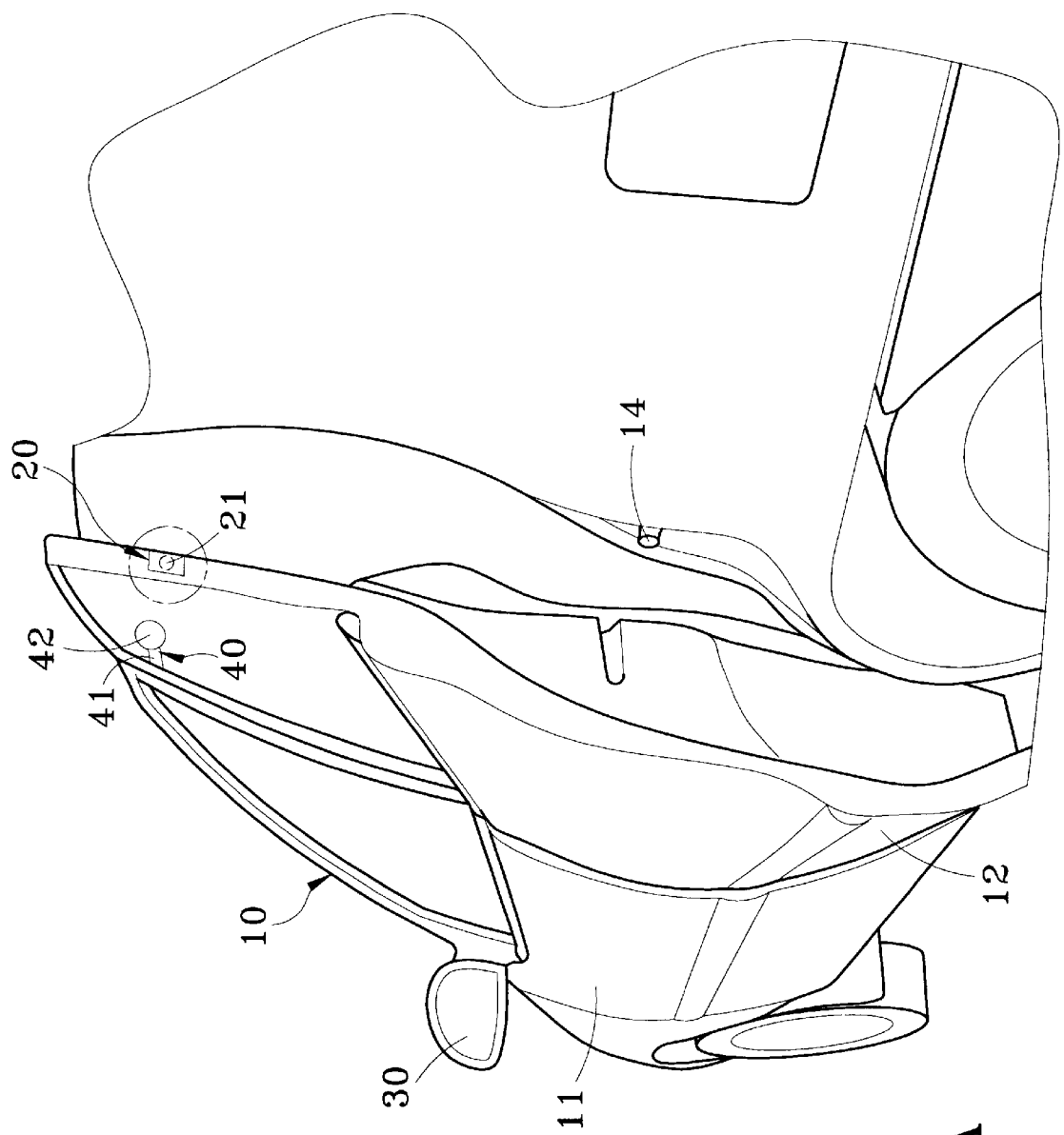
FIG. 3A is a schematic view of the invention in use, showing the car door at an initial opening condition.

In addition, a warning light 20 is installed on the car doors 11 and 12 according to the desired opening angle. The warning light 20 includes a rear light face 22 and a side light face 21 corresponding to the opening angles of the car doors 11 and 12. Refer to FIG. 3 for a car condition with the rear car door 12 opened. There is a control switch 14 installed on the car 10 to turn on the warning light 20 when the car door 12 (or 11) is opened. The control switch 14 adopts a design for low cost production. It may be electrically connected to the night light (roof light) 13 existed in the car. In other words, the car 10 usually has a control switch 14 for turning on the lights installed on the car doors 11 and 12, or the night light 13 installed under the roof of the car 10 to alert the driver that the car door is open, or enable passengers to tend articles in the car. As the warning light 20 of the invention must be turned on concurrently when the car doors 11 and 12 are opened, it is preferably to electrically connect the warning light 20 to the control switch 14 to synchronize the operations.

When the car doors 11 and 12 are opened initially as shown in FIG. 2, the control switch 14 issues signals to turn on the warning light 20. Considering that the car may be temporarily parked, and the doors 11 and 12 may be not fully opened in normal to the car 10, therefore the warning light 20 is designed with a rear light face 22 and a side light face 21 corresponding to the opening angles of the car doors 11 and 12. As shown in FIG. 3, when the car doors 11 and 12 are at an initial opening state, the side light face 21 is directed to face the rear approaching cars. When the car doors 11 and 12 are fully opened as shown in FIG. 2, the rear light face 22 is directed to face the rear approaching cars. Such a design can ensures that once the car doors 11 and 12 are opened at any angle, warning light will always be turned on to reach the rear approaching cars. The design also helps when the car is parked on a narrow alley at night with the warning light 20 to alert the cars approaching sideward. In order to further enhance the warning effect and increase safety (especially driving at night), the warning light 20 may be made a running light or blinking light as shown in FIG. 3B.

By means of the design of the rearview mirrors 30, 40 and 50 of the invention set forth above, passengers in the front seat and rear seat can see whether there are rear approaching cars on the rearview mirrors 30, 40 and 50, and judge the safety distance before opening the car doors 11 and 12. This provides the first protection measure. In circumstances such as bad weather (such as foggy, raining, night time, etc.), roads on the rolling hills, obstructive rearview due to other objects or the rear cars are speeding, especially when the passengers linger in the car and the car doors 11 and 12 remain open for a prolonged period of time, the warning light 20 of the invention may further alert the rear approaching cars, thus provide a double protection to prevent the accidents from taking place, and to ensure the safety of the people and the cars.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A warning module for rear approaching cars installed on a rear car door of a car to alert passengers and the rear approaching cars to achieve a safety and a warning effect, the rear car door having a first surface facing a back side of the car when the rear car door is in a semi-opened position, and a second surface facing the back side of the car when the rear car door is fully opened, said warning module comprising:

a rearview mirror mounted onto the rear car door to enable the passengers to see the rear approaching cars in a selected angular range and to decide whether to open the rear car door; and a warning light mounted on the rear car door including a side light-emitting element located at said first surface for generating light when the rear car door is semi-opened, and a rear light-emitting element located at said second surface for generating light when the rear car door is fully opened.

2. The warning module for rear approaching cars of claim 1, further having a control switch installed in the car for turning on the warning light when the car door is opened, and turning off the warning light when the car door is closed.

3. The warning module for rear approaching cars of claim 2, wherein the control switch connects electrically to a night light in the car.

4. The warning module for rear approaching cars of claim 2, wherein the warning light has an L-shape and is flush with the car door.

5. The warning module for rear approaching cars of claim 1, wherein the warning light is a running light.

6. The warning module for rear approaching cars of claim 1, wherein the warning light is a blinking light.

7. The warning module for rear approaching cars of claim 1, wherein the car door is a front car door.

8. The warning module for rear approaching cars of claim 1, wherein the rearview mirror includes an anchor element fastened to the interior of the car door and a mirror mounted onto the anchor element.

9. The warning module for rear approaching cars of claim 1, wherein the rearview mirror includes an anchor element fastened to the exterior of the car door and a mirror mounted onto the anchor element.

10. The warning module for rear approaching cars of claim 1, wherein the car door is a rear car door and wherein the warning light is flush with the car door.

11. The warning module for rear approaching cars of claim 1, wherein the warning light has an L-shape and is flush with the car door.

12. The warning module for rear approaching cars of claim 1, wherein the warning light is built into the car door and wherein the rearview mirror is on an interior of the car door.

13. The warning module for rear approaching cars of claim 12, further comprising an anchor element mounted to the car door, the mirror being mounted on the anchor element, the anchor element having an L-shape.

14. The warning module for rear approaching cars of claim 13, wherein the warning light is flush with the car door.

15. The warning module for rear approaching cars of claim 14, wherein the warning light has an L-shape.

16. The warning module for rear approaching cars of claim 15, wherein the car door is a rear car door and wherein the warning light is next to a window of the car door.

17. The warning module for rear approaching cars of claim 1, wherein the car door has an opening for a window and wherein the warning light is mounted on the car door adjacent the opening for the window at a position above a lower side of the opening for the window.

* * * * *